May 26, 1925.
G. W. POILLON, JR
MOTOR SILENCER
Original Filed July 14, 1921
1,539,769
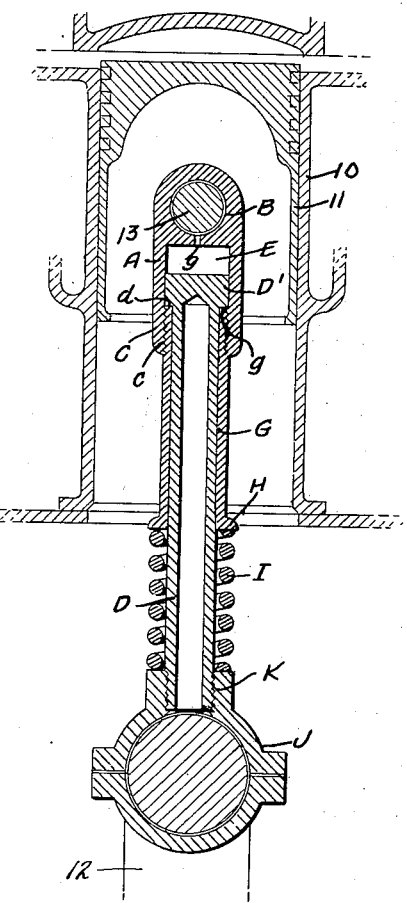
Fig.1.
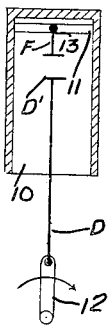 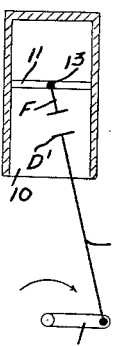 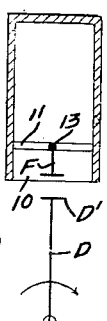 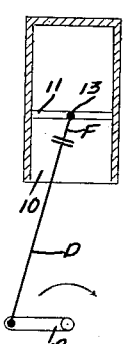 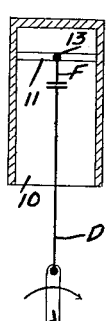 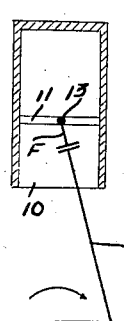 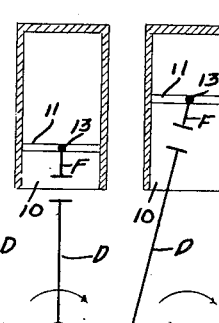
Fig.2.  Fig.3.  Fig.4.  Fig.5.  Fig.6.  Fig.7.  Fig.8.  Fig.9.
WITNESSES
H. J. Walker
INVENTOR
GEORGE W. POILLON JR.
BY
ATTORNEYS Patented May 26, 1925.

1,539,769

UNITED STATES PATENT OFFICE.

GEORGE WASHINGTON POILLON, JR., OF TARRYTOWN, NEW YORK.

MOTOR SILENCER.

Application filed July 14, 1921, Serial No. 484,588. Renewed November 25, 1924.

*To all whom it may concern:*

Be it known that I, GEORGE W. POILLON, Jr., a citizen of the United States, and a resident of Tarrytown, in the county of Westchester and State of New York, have invented a new and Improved Motor Silencer, of which the following is a full, clear, and exact description.

The general object of my invention is to provide a novel arrangement of a yieldable piston whereby the piston on the scavenging stroke will be projected to occupy the full volumetric clearance and will yield on the compressing stroke, as well as to provide a piston assemblage of the type indicated having particular advantages as will appear. Said object is attained by telescopically mounting the piston on the connecting rod to adapt it to recede thereon under the pressure of the fuel charge when compressed, and opposing said pressure by means to impart an expelling movement to the piston relatively to the connecting rod, additional to the scavenging movement of the piston with the connecting rod.

The nature of the invention and its distinctive features and advantages will clearly appear as the description proceeds.

Reference is to be had to the accompanying drawings forming part of this specification, it being understood that the drawings are merely illustrative of one example of the invention.

Figure 1 is a longitudinal section of a piston and connecting rod embodying my invention, the view including also an engine cylinder and crank shaft.

Figures 2 to 9 are diagrammatic views showing the various relative positions in a four-stroke cycle of operations.

In the illustration, the numeral 10 indicates conventionally one of the cylinders of an internal combustion engine, 11 the piston thereof, 12 the crank arm, and 13 the wrist pin on the piston.

In carrying out my invention in accordance with the illustrated example, I provide a knuckle A presenting a bearing B for the wrist pin 13, the lower end of the said knuckle having a socket C, into which the forward end of the connecting rod designated generally by the letter D extends, said connecting rod having a plunger head D' adapted for movement in a chamber E at the inner end of the socket C. An oil hole F leads from the bearing B to chamber E. On the connecting rod D is a sleeve G threaded at one end to engage internal threads c on the socket C of the knuckle A. The front end of the sleeve G within the socket C forms a seat g for the rear side or shoulder d of plunger head D'. The forward end of the sleeve G determines the clearance afforded the rod D in the chamber E and said sleeve may be adjusted accordingly, one advantage being that wear may be taken up by the adjustment of the sleeve. A spring I is coiled about the connecting rod D and abuts at one end against a flange H on the adjacent end of the sleeve G, the opposite end of said spring abutting against the crank shaft bearing J, which is secured by a threaded connection or equivalent means, as at K, to the adjacent end of the connecting rod D.

With the above described construction, the piston 11 with the knuckle A may telescope the connecting rod D; thus, the piston may recede in the cylinder 10 and relatively to the connecting rod under the pressure exerted on the piston in the compression of the charge, the plunger D' having clearance in the chamber E. In the receding movement of the piston, the spring I will be tensioned, and as soon as the pressure is released from the cylinder, or to an extent to become inferior to the spring I, said spring will react and force the sleeve G, knuckle A and piston 11 to a forward position with sufficient force to have an expelling action on the gases in front of the piston. It will be observed that the forward and back movement of the piston 11 relatively to the connecting rod D is additional to the general scavenging stroke of the connecting rod and piston in the cycle of operation.

Comparing the diagrammatic figures and starting with the piston at the top center about to begin an intake stroke, as in Figure 2, it will readily be understood that pressure does not exist in the combustion chamber at this time, the spring I acting to position the piston at the extreme top end of the cylinder or, in other words, to occupy the volumetric clearance. With the pulling down of the piston by the crank shaft and during the suction stroke, the spring I under its own tension and with the aid of the exhausting vacuum and the inertia of the piston assembled, is allowed to maintain the tube G with its seat g firmly against the plunger head D. Thus, the piston is allowed to start at the top of the cylinder and finish its suction stroke as usual. In practice, the lag of the intake valve closing is made to conform to the design and speed of the engine and the tension of the spring I. At the beginning of the compression stroke (Fig. 4), the cylinder pressure on the piston is slightly below atmospheric. The pressure gradually increases on the piston, thereby compressing the spring I (by pressure transmitted through knuckle A and sleeve G) to the point where, as seen in Fig. 5, the plunger head D' is firmly seated on the seat g of tube G, the arrangement affording a combustion space, as in Fig. 6. Upon combustion of the charge, the resulting pressure drives the piston downwardly with decreasing pressure, as the descent of the piston continues until that time when cylinder pressure falls below the tension of the spring I. At this time, the piston is again forced to the extreme of the connecting rod length, as in Fig. 8. As the pressure of the gas during the exhaust stroke (Fig. 9) does not equal the spring tension, the burnt gases may be driven from the cylinder into a muffling receptacle with a force equalling the spring tension plus the inertia of the piston assembly. The exhaust valve closes in the piston position of Figure 2. The arrangement may be used with or without partial muffling to raise the heat value of gases relying upon kinetic energy to properly scavenge the cylinder of burnt gases.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. In an internal combustion engine, a connecting rod having a plunger at the forward end, a piston, a knuckle having a bearing for the wrist pin at the piston and having a chamber in which said plunger may have movement, a sleeve on the connecting rod, said sleeve being secured to said knuckle the front end of the sleeve forming a seat for the plunger in the forward position of the piston, and a spring coiled about the connecting rod exerting its pressure at one end against said sleeve.

2. In an internal combustion engine, a connecting rod having a plunger at the forward end, a piston, a knuckle having a bearing for the wrist pin at the piston and having a chamber in which said plunger may have movement, a sleeve on the connecting rod, said sleeve being secured to said knuckle by a threaded connection to determine the size of said chamber or to take up wear, the front end of the sleeve forming a seat for the plunger in the forward position of the piston, and a spring coiled about the connecting rod and exerting its pressure at one end against said sleeve.

GEORGE WASHINGTON POILLON, Jr.